United States Patent [19]

Gates

[11] 4,203,469
[45] May 20, 1980

[54] FOUR WAY REVERSING VALVE FOR AIR CONDITIONING SYSTEMS

[76] Inventor: James T. Gates, 1611 Kirkley Rd., Columbus, Ohio 43221

[21] Appl. No.: 914,666

[22] Filed: Jun. 9, 1978

[51] Int. Cl.² .................... F16K 31/16; F16K 11/085
[52] U.S. Cl. ................................ 137/625.43; 251/58; 251/30
[58] Field of Search .................... 137/625.43; 251/30, 251/58

[56] References Cited

U.S. PATENT DOCUMENTS

| 2,921,604 | 1/1960 | Zettl | 137/625.43 |
| 2,990,853 | 7/1961 | Sharp | 137/625.43 X |
| 3,469,604 | 9/1969 | Ludwig | 137/625.43 |

*Primary Examiner*—Arnold Rosenthal
*Attorney, Agent, or Firm*—Sidney W. Millard

[57] ABSTRACT

A pressurized plate-type reversing valve for A/C systems having unobstructed straight through fluid reversal passageways with pilot and main operating valves and control connections built into the housing structure.

5 Claims, 8 Drawing Figures

FOUR WAY REVERSING VALVE FOR AIR CONDITIONING SYSTEMS

The urgency for fuel and economical use of energy becomes more apparent with the passing of time. Yet, refrigeration and heat must be provided for the many needs in the preservation of food, winter heating and other uses too numerous and needless to mention. The so-called Heat Pump is one of today's more popular methods being used to meet this demand. The Heat Pump does not require natural gas, is easily adapted in many installations and takes advantage of climatical conditions to aid in the cooling and heating process. The system makes use of a reversing valve for cooling, or upon reversing the flow of refrigerant provides heat. On cool days for example heat is supplied to the main area of a supermarket while at the same time food refrigeration is provided from the same system. A refrigerant liquid in a closed loop of this type system includes a compressor, a flow reversing valve, a condenser, an expansion valve and an evaporator. Depending on the direction the refrigerant flow is cycled from the compressor, by action of the reversing valve, either internal heat or internal cooling is produced.

The type and design of the reversing valve used in the aforementioned system is important to its cost of operation. Due to the fact that both high and low pressure lines enter the valve in close proximity it can be understood that loss of pressure between porting can reduce efficiency tremendously. Obstructions in the flow are important to avoid. Also apparent is the delicacy of having external pilot valve tubes for control of the main valve. Such external tubes are difficult to install and can provide a source of damage in shipment by becoming detached or broken. A large percentage of such valves for reversing refrigerant flow have a 180° return tube travel through a very short radius of about one inch. Until recently the need for a more efficient valve has not been too urgent. The losses mentioned can be avoided by a valve having a better sealing method and straight through refrigerant flow. Such a reversing valve has long been desired, but a practical design has not yet been offered.

In the reversing valve of this disclosure, no such mentioned difficulties exist. Reversal passageways are uninterrupted, as they are straight through. Being a reversing valve of the modified plate type, wear and cost of processing close radial tolerances have been eliminated. There are no external control tubes. The matching valve plate surfaces are pressurized and axially flexible to accommodate misalignment and differential expansion. The top valve plate is sealed with a flexible metal diaphragm attached to the housing structure.

With these objectives in mind, details of my reversing valve are hereby disclosed. Features of the invention will become apparent as one studies the representative diagrammatic drawings in which:

FIG. 1 is the sealed housing of the flow reversing valve, showing the preferred assembly arrangement. Two inlet tube appendages are shown at the bottom and two similar outlet tubes at the top.

FIG. 2 is a cross section of FIG. 1 in the direction of arrows 2—2, FIG. 3. The top section of the valve, FIG. 3, has been rotated 45° in FIG. 2 to show the two outlet ports as they make connections with the main valve cylinder. Encircled at the right is shown an alternate weldment method of assembly without the requirement of bolts.

Figure 5:
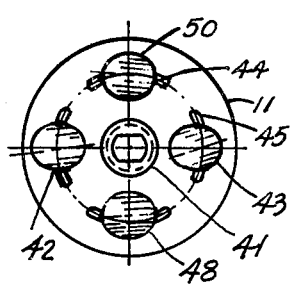
Figure 2:
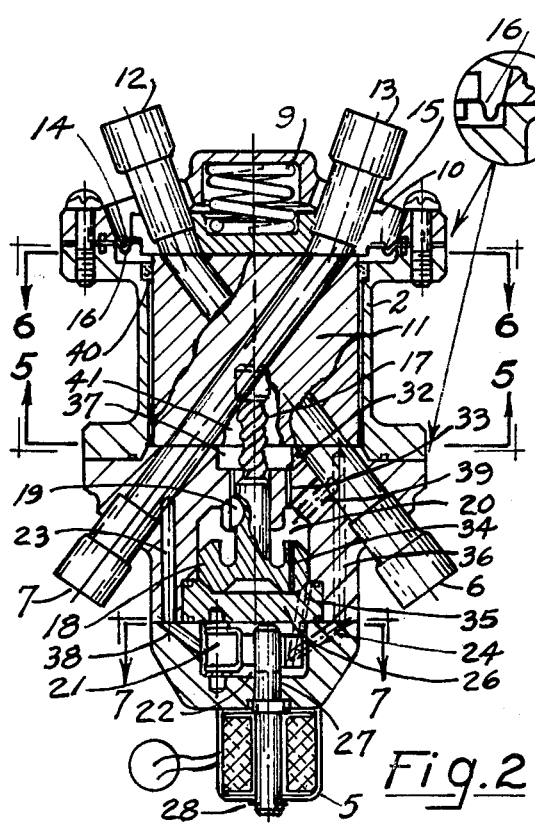

FIG. 5 is a bottom view of the 90° rotational valve cylinder or plate proper as seen in the direction of the arrows 5—5, FIG. 2. Also, at the center is a press fit high helix angle round leadscrew nut. Shallow shock prevention grooves are shown between the through holes.

Figure 6:
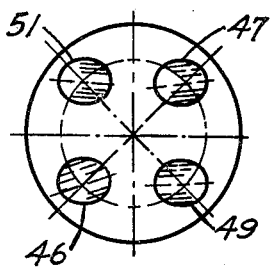

FIG. 6 is the opposite end surface of the valve cylinder or plate as seen in the direction of arrows 6—6, FIG. 2.

Figure 7:
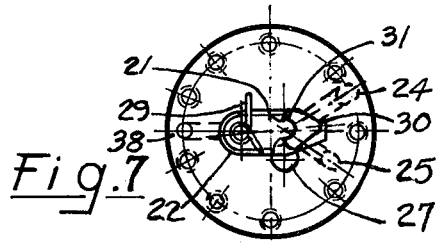
Figure 4:
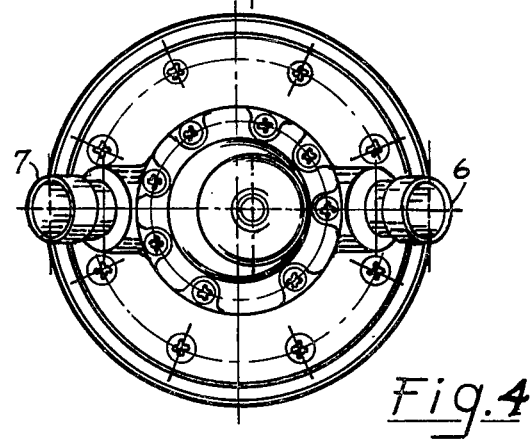
FIG. 4 is a bottom view of the valve housing showing the two inlet ports and the top of an electric magnet coil that energizes the pilot valve on command.

FIG. 7 is a plan view of the pilot valve shown in the direction of the arrows 7—7, FIG. 2. The pilot valve initiates the flow reversal of the main valve cylinder.

Figure 8:
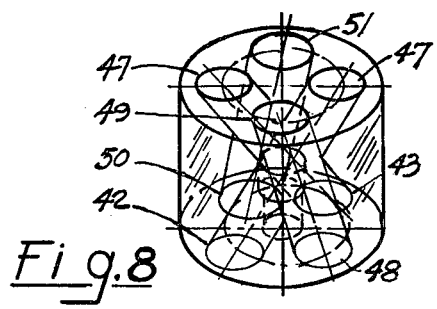

FIG. 8 is a phantom view of the main valve cylinder or plate, showing the out of rotational phase of the four through holes. The threaded press fit insert in the center of the cylinder is also indicated in this phantom view.

Figure 3:
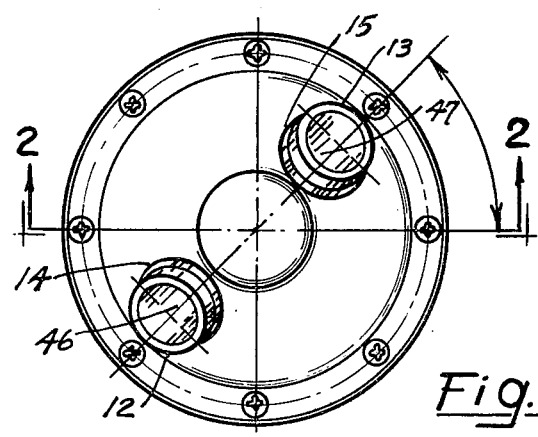
FIG. 3 is a view of the top of the valve housing showing the normal position of the two outlet ports.
Figure 1:
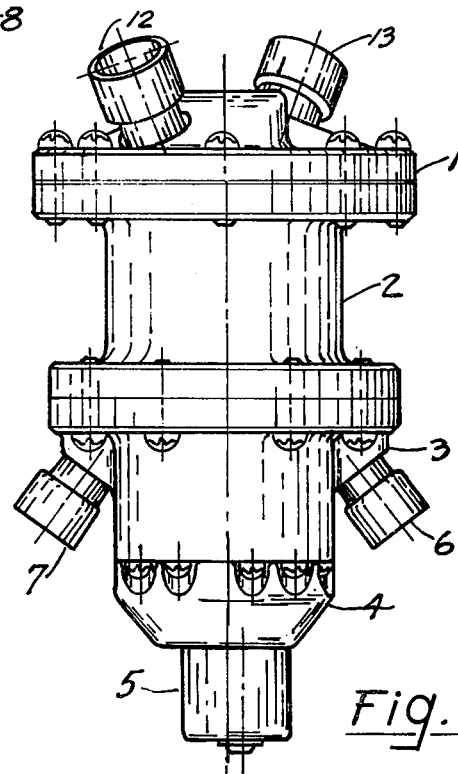

This is how the reversing valve works:

FIG. 1 shows the sealed non-magnetic housing of the reversing valve disclosure. The housing consists of a top plate section 1, main valve section 2, bottom plate section 3, pilot valve section 4 and electric magnet 5. Sealed by brazing or other attachment means to the housing section are two tubular inlet ports 6 and 7. The use of labyrinth seals and bolting is the preferred method of assembly of the housing sections; however, a brazing or weldment means may be used, as indicated in FIG. 2, item 8. In FIG. 2, a spring 9 loads surface ground plate 10 against the top surface of main reversing valve cylinder plate 11. Plate 10 has two tubular ports 12 and 13 similar to the bottom inlet ports 6 and 7. These top ports are brazed or attached by other means to through holes in plate 10. These outlet tube appendages extend up through two clearance holes 14 and 15 in the top plate section 1. These openings are seen in their correct orientation in FIG. 3, but in FIG. 2 plate 10 has been rotated 45° clockwise to best show the tubular porting and their integral attachment to plate 10. A flexible diaphragm 16 is brazed to an undercut in the periphery of plate 10. The diaphragm in turn is bolted between the labyrinth seal housing sections 1 and 2. The main reversing cylinder plate 11 is free to rotate 90° only by complete injection of the double threaded high helix pitch angle leadscrew 17. This main valve cylinder plate 11 is supported at the top by a bearing ring 40 press fit into the upper relief area of section 2. Leadscrew 17 is an integral part of the main reversing valve operating piston 18. This leadscrew 17 is kept from rotating by means of key 19 in a keyway of housing 3. The piston 18 is caused to operate by a pressure drop in the piston cylinder chamber 20 by action of pilot flapper valve 21. Inlet 6 is for attachment to a high pressure line; 7 is for attachment to a low pressure line. In installation this is generally done by a soldering process. The low pressure line 7 is connected to pilot valve chamber 22 by way of hole 23 of lower plate section 3 and mating hole 38 section 4. Two holes 24 and 25, best viewed in FIG. 7, connect to the two sides of piston chamber 20 in section 3, FIG. 2. These holes 24 and 25 connect with matching holes 35 and 36 respectively in section 3 when assembled. At the time of said assembly a labyrinth seal insert 26 is forced between sections 3 and 4. A magnetized stud 27 has previously been press fit through the pilot valve housing section 4 into pilot valve chamber 22. The stud 27 is shaped at the end nearest pilot valve 21 such that only half the diameter protrudes into cavity 22. The external portion of stud 27 is covered by a modular D.C. Coil 5 held in place by retainer ring 28. The pilot flapper valve 21, FIG. 7, is spring 29 loaded against port 24 by the articulated pilot end 30 pressed over the cylindrical end 31 of flapper valve 21. In the unenergized position shown, low pressure refrigerant gas enters chamber 22 through hole 23 in section 3 from the normally installed low pressure inlet line at 7 thence into chamber 22 by way of hole 38. By this means low pressure gas enters open hole 25 then through mating hole 35 in seal 26 to the lower side of piston 18 in piston chamber 20. High pressure gas at the same time enters into clearance chamber 37 by way of small hole 32, FIG. 2, from high pressure port 6 normally supplied by attachment not shown. High pressure gas then travels through small hole 33 into chamber 20. High pressure is also allowed to pass through small hole 34 in piston 18. However, in the unenergized position shown, hole 34 is closed off by virtue of the position of the piston. Low pressure gas hole 25 is also closed by the lower end of piston 18. Hole 24 is closed by the spring loaded unenergized flapper valve 21 such that high pressure gas does not backtrack through this line. High pressure gas above piston 18 holds the piston and therefore the main reversing valve cylinder plate 11 in a fixed position. In this attitude, low pressure is allowed to enter port 7 and travel straight through the main valve to exit at port 13 above. High pressure gas is allowed to enter port 6 passing straight through the valve to exit at port 12. A detailed explanation of the main cylinder plate valve design is described later in the disclosure.

When D.C. coil 5 is energized, stud 27 is magnetized, thus attracting flapper valve 21 which flips end 30 to the other side of chamber 22 and thereby closes opposite pilot valve hole 25. Low pressure gas from the so-called suction line 7 enters hole 24 mating with hole 36 in section 3 thence into hole 39 to enter piston cylinder chamber 20 above piston 18. The differential pressure causes piston 18 to move the high helix pitch angle double threaded leadscrew 17 up into the mating thread 41 of the main reversing valve cylinder plate 11 rotating the valve 90°. When piston 18 reaches the upper limit position, it closes off low pressure hole 39. High pressure continues to flow through small hole 32 from high pressure port 6 and thence through hole 33 to mating piston hole 34 allowing high pressure to flow to the bottom side of piston 18 to keep same stable in this attitude as long as the flapper valve 21 is energized. Since energized flapper valve 21 now closes hole 25 high pressure gas does not backtrack into flapper valve chamber 22.

Construction of the main reversing valve cylinder plate is depicted in FIGS. 5, 6 and 8. FIG. 5 is a view of the main reversing valve cylinder plate as one would view its bottom from the flow entrance side in the direction 5—5, FIG. 2. Pressure shock relief grooves 44, 45 are shown in the surface to minimize sudden pressure surges on plate 11 when it is rotated to change the flow direction of the fluids conveyed. Note that the grooves extend from one hole toward the next hole and they combine to extend a distance such that there is less than one hole diameter between the closest ends of the grooves. In the center surface of the bottom of the main reversing valve, FIG. 5, is a press fit mating female leadscrew nut 41 which turns the main valve 90° when the non-rotatable leadscrew 17 is forced in, or retracted, an axial distance of about ½ inch. The axial force available is over 100 pounds thrust. The opposite parallel valve cylinder surface viewed in direction 6—6, FIG. 2, is shown in FIG. 6. Note that these exit holes as seen are each 45° out of rotation phase with the entrance holes, but when actual connections are made two through holes are 135° out of phase and the remaining two holes are only 45° out of phase (see FIG. 8). Remember that the true outlet port positions are as shown in FIG. 3 and that in FIG. 2 these ports only have been rotated 45° to show the outlet arrangement.

FIG. 8 is a phantom view of the through hole connections, showing that entrance hole 42 exits on the top of the valve cylinder at 47 135° out of phase with the opposite entrance hole. Entrance hole 43 also exits at the top of the valve 135° out of phase. But entrance holes 48 and 50 are only 45° out of rotational phase with top exit holes 49 and 51 respectively. The entrance holes 42 and 43 in the unenergized position match with entrance ports 7 and 6 respectively. These same holes match on the opposite side of cylinder valve 11 with holes 47 and 46 respectively, FIG. 6. Holes 47 and 46 now match with exit ports 13 and 12 respectively making a straight through flow path.

When the main valve cylinder plate 11 is reversed by a 90° clockwise rotation as viewed in FIG. 5, entrance holes 48 and 50 now match with entrance ports 7 and 6 respectively. But note that the through holes are now reversed in direction, FIG. 8. Holes 48 and 50 extend through the main valve cylinder and exit at holes 49 and 51 respectively. These holes now still match with exit ports 13 and 12 respectively but the direction of flow has been reversed. The flow now takes a slightly shorter path but still travels straight through the valve.

What I claim is:

1. A reversing valve including a sealed housing having two inlet ports and two exit ports,
    a cylinder plate valve contained in said housing and terminating in two parallel surfaces,
    means forming four holes through said plate, each said hole having an opening at each parallel surface, the centerline of each opening being spaced at 90° at each surface,
    the two inlet ports being located at one end of the housing and spaced 180° apart, the two exit ports being located at the other end of the housing and spaced 180° apart, the exit and inlet ports being 45° out of rotational phase, two of said holes exit 135° out of phase with their entrance holes and two of said holes to exit 45° out of phase with their entrance holes,
    means for rotating said plate and aligning either of two of said entrance holes with either of the two inlet ports.

2. The valve of claim 1 including pressure shock relief grooves in one surface of the plate, said grooves extending from each hole to within less than one hole diameter distance of the nearest hole.

3. The valve of claim 1 including a high pitch helix angle non-rotatable leadscrew attached to a piston, said piston being mounted to reciprocate within said housing and on an axis perpendicular to said parallel surfaces, one end of said leadscrew extending into and mating with screw threads in said plate whereby, reciprocation of said piston results in rotation of said plate.

4. The valve of claim 1 including a spring pressure loaded seal diaphragm abutting one of said parallel surfaces.

5. The valve of claim 3 including means for causing the piston to reciprocate.

* * * * *